(12) United States Patent
Kondoh

(10) Patent No.: US 7,661,653 B2
(45) Date of Patent: Feb. 16, 2010

(54) ELECTROMAGNETIC ACTUATOR

(75) Inventor: Jirou Kondoh, Kariya (JP)

(73) Assignee: Denso Corporation, Kariya (JP)

( * ) Notice: Subject to any disclaimer, the term of this patent is extended or adjusted under 35 U.S.C. 154(b) by 334 days.

(21) Appl. No.: 11/905,688

(22) Filed: Oct. 3, 2007

(65) Prior Publication Data

US 2008/0084263 A1 Apr. 10, 2008

(30) Foreign Application Priority Data

Oct. 6, 2006 (JP) .............................. 2006-275338

(51) Int. Cl.
*F16K 31/06* (2006.01)
*H01F 7/08* (2006.01)
(52) U.S. Cl. .................... 251/129.15; 335/278; 335/281
(58) Field of Classification Search ................. 335/255, 335/278, 281; 251/129.01, 129.15; 310/15
See application file for complete search history.

(56) References Cited

U.S. PATENT DOCUMENTS 4,472,699 A * 9/1984 Fujii et al. .................. 335/281

FOREIGN PATENT DOCUMENTS

JP 2003-097756 4/2003

* cited by examiner

*Primary Examiner*—Ramon M Barrera
(74) *Attorney, Agent, or Firm*—Nixon & Vanderhye P.C.

(57) ABSTRACT

An electromagnetic actuator includes a coil, which is formed in an annular shape, a plunger, and a stator, which receives the coil inside the stator and forms a magnetic circuit along inner and outer circumferences of the coil through the plunger. The stator includes first and second stators. The first stator includes a magnetic attraction portion that attracts the plunger in an axial direction of the plunger by magnetic force generated by the coil, and a first yoke portion that covers the outer circumference of the coil. The second stator includes a radial direction magnetism delivery-receipt portion that delivers magnetism in a radial direction of the plunger to and receives magnetism in the radial direction from the plunger, and a second yoke portion that covers the outer circumference of the coil. The first yoke portion and the second yoke portion overlap in the axial direction and are magnetically joined.

6 Claims, 3 Drawing Sheets

ELECTROMAGNETIC ACTUATOR

CROSS REFERENCE TO RELATED APPLICATION

This application is based on and incorporates herein by reference Japanese Patent Application No. 2006-275338 filed on Oct. 6, 2006.

BACKGROUND OF THE INVENTION

1. Field of the Invention

The present invention relates to an electromagnetic actuator.

2. Description of Related Art

An electromagnetic actuator includes a coil, a plunger, and a stator. The coil generates magnetic force when energized. The plunger is driven by magnetic force generated by the coil. The stator forms a magnetic circuit. A driven object (e.g., valve) is driven by displacement of the plunger (e.g., JP2003-97756A).

The stator forms the magnetic circuit along inner and outer circumferences of the coil through the plunger. The stator is formed by combining components to receive the coil inside the stator.

More specifically, a conventional stator described in JP2003-97756A, for example, is formed by joining a magnetic attraction portion, a radial direction magnetism delivery-receipt portion, and a cylindrical yoke. The magnetic attraction portion attracts the plunger in its axial direction. Magnetism in a radial direction of the plunger is delivered and received between the plunger and the radial direction magnetism delivery-receipt portion. The yoke covers an outer circumference of the coil.

In the stator in JP2003-97756A and the like, magnetism is delivered and received at a joining portion of the magnetic attraction portion and the yoke, and magnetism is delivered and received at a joining portion of the radial direction magnetism delivery-receipt portion and the yoke. That is, in the conventional stator, magnetism is delivered and received at two joining portions.

Since magnetic loss by a contact resistance is caused at the joining portion, magnetic force generated at the stator decreases due to the joinings at two portions. Accordingly, there is a problem that attraction of the plunger is decreased.

The magnetic attraction portion and the yoke are joined by joining an outer circumferential portion of a flange portion having a disc-like ring shape, which is formed at the magnetic attraction portion, and an inner circumferential surface of the yoke, respectively. The radial direction magnetism delivery-receipt portion and the yoke are joined by joining an outer circumferential portion of a flange portion having a disc-like ring shape, which is formed at the radial direction magnetism delivery-receipt portion, and the inner circumferential surface of the yoke, respectively. That is, in the conventional stator, the components are joined at the respective outer circumferential portions of the flange portions, which are small areas.

Magnetic loss is large because of a small joining area, so that magnetic force generated at the stator decreases and attraction of the plunger is decreased. Furthermore, magnetic saturation is easily reached because of a small joining area, so that magnetic flux of the stator is difficult to increase and attraction of the plunger is prevented from increasing.

Thus, due to the small joining area as well as the joinings at two portions in the conventional stator of the electromagnetic actuator, magnetic loss is large and attraction of the plunger is prevented from being improved.

SUMMARY OF THE INVENTION

The present invention addresses the above disadvantages. Thus, it is an objective of the present invention to provide an electromagnetic actuator, in which magnetic loss caused at a joining portion in a stator is reduced.

To achieve the objective of the present invention, there is provided an electromagnetic actuator including a coil, a plunger, and a stator. The coil is formed in an annular shape. The coil generates magnetic force when energized. The stator receives the coil inside the stator. The stator forms a magnetic circuit along inner and outer circumferences of the coil through the plunger. The stator includes a first stator and a second stator. The first stator includes a magnetic attraction portion that attracts the plunger in an axial direction of the plunger by the magnetic force generated by the coil, and a first yoke portion that covers the outer circumference of the coil. The second stator includes a radial direction magnetism delivery-receipt portion that delivers magnetism in a radial direction of the plunger to and receives magnetism in the radial direction from the plunger, and a second yoke portion that covers the outer circumference of the coil. The first yoke portion and the second yoke portion overlap in the axial direction and are magnetically joined.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An electromagnetic actuator according to an embodiment of the present invention includes a coil, a plunger, and a stator. The coil is formed annular and generates magnetic force when energized. The plunger is attracted by magnetic force generated by the coil. The stator forms a magnetic circuit along inner and outer circumferences of the coil through the plunger.

The stator includes a first stator formed by combining a magnetic attraction portion and a first yoke portion, and a second stator formed by combining a radial direction magnetism delivery-receipt portion and a second yoke portion. The magnetic attraction portion attracts the plunger in its axial direction. The first yoke portion covers an outer circumference of the coil. Magnetism in a radial direction of the plunger is delivered and received between the radial direction magnetism delivery-receipt portion and the plunger. The second yoke portion covers the outer circumference of the coil. The first yoke portion and the second yoke portion are magnetically joined, overlapping in the axial direction.

The embodiment, in which an electromagnetic actuator of the present invention is applied to an oil flow control valve (OCV) of a variable valve timing apparatus (VVT), is described below with reference to drawings. In the embodiment, a characterizing portion of the OCV, to which the present invention is applied, is explained in a description of a configuration of the OCV.

(VVT)

Figure 4:
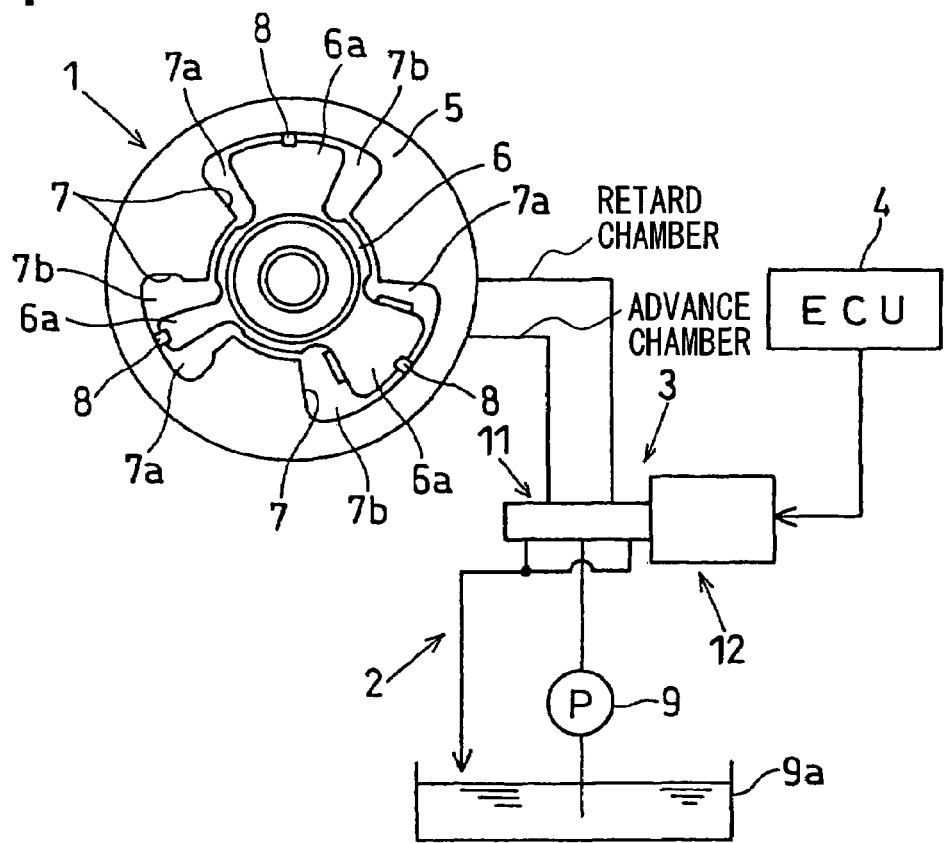
FIG. 4 is a schematic view illustrating a VVT apparatus according to the embodiment.

A schematic configuration of the VVT is described below with reference to FIG. 4.

The VVT includes a variable valve timing mechanism (VCT) 1, an oil hydraulic circuit 2, and an ECU (engine control unit) 4. The VCT 1 is attached to a camshaft (any of a camshaft for an inlet valve, a camshaft for an exhaust valve, and a camshaft for inlet and exhaust valves) of an internal-combustion engine (engine). The VCT 1 continuously varies timing to open and close the valve. The oil hydraulic circuit 2 hydraulically controls the VCT 1. The ECU 4 electrically controls an OCV 3 disposed in the oil hydraulic circuit 2.

(VCT 1)

The VCT 1 includes a shoe housing 5 and a vane rotor 6. The shoe housing 5 is driven to rotate in synchronization with a crank-shaft of the engine. The vane rotor 6 is disposed to relatively rotate to the shoe housing 5, and rotates together with the camshaft. By driving the vane rotor 6 to relatively rotate to the shoe housing 5 by a hydraulic actuator in the shoe housing 5, the camshaft is advanced or retarded.

The shoe housing 5 is joined to a sprocket, which is driven to rotate by the crank-shaft of the engine via a timing belt or a timing chain, using a bolt or the like, and rotates together with the sprocket. As shown in FIG. 4, generally fan-like recess portions 7 (three recess portions 7 in the embodiment) are formed inside the shoe housing 5. The shoe housing 5 rotates clockwise in FIG. 4, and this rotational direction is an advance direction.

The vane rotor 6 is positioned at an end portion of the camshaft by a positioning pin or the like. The vane rotor 6 is fixed to the end portion of the camshaft with a bolt or the like, and rotates together with the camshaft.

The vane rotor 6 includes a vane 6a, which divides the recess portion 7 of the shoe housing 5 between an advance chamber 7a and a retard chamber 7b. The vane rotor 6 is disposed to rotate within a predetermined angle in reference to the shoe housing 5.

The advance chamber 7a is a hydraulic chamber for driving the vane 6a in the advance direction by hydraulic pressure, and is formed in the recess portion 7 on an opposite side to a rotational direction of the vane 6a. The retard chamber 7b is a hydraulic chamber for driving the vane 6a in a retard direction by hydraulic pressure. Liquid tightness in the advance chamber 7a and the retard chamber 7b is maintained by a sealing member 8 and the like.

(Oil Hydraulic Circuit 2)

The oil hydraulic circuit 2 is a means for rotating the vane rotor 6 relatively to the shoe housing 5 by supplying oil to and discharging oil from the advance chamber 7a and the retard chamber 7b and thereby generating a hydraulic pressure difference between the advance chamber 7a and the retard chamber 7b. The oil hydraulic circuit 2 includes an oil pump 9 and the OCV 3. The oil pump 9 is driven by the crank-shaft or the like. The OCV 3 generates the hydraulic pressure difference between the advance chamber 7a and the retard chamber 7b by allocating oil (hydraulic pressure), which is pumped by the oil pump 9, to the advance chamber 7a or the retard chamber 7b.

(OCV 3)

The OCV 3 is described with reference to FIG. 1.

The OCV 3 is an electromagnetic spool valve, in which a spool valve 11 and an electromagnetic actuator 12 are joined.

(Spool Valve 11)

The spool valve 11 includes a sleeve 13, a spool 14, and a return spring 15.

The sleeve 13 has a generally cylindrical shape, and has input and output ports. More specifically, the sleeve 13 of the embodiment has an insertion hole 13a, a hydraulic pressure supply port 13b, an advance chamber communicating port 13c, a retard chamber communicating port 13d, and a drain port 13e. The insertion hole 13a supports the spool 14 slidably in an axial direction of the spool valve 11. The hydraulic pressure supply port 13b communicates with an oil discharge port of the oil pump 9. The advance chamber communicating port 13c communicates with the advance chamber 7a. The retard chamber communicating port 13d communicates with the retard chamber 7b. Oil is returned to an oil pan 9a (FIG. 4) from the drain port 13e.

The hydraulic pressure supply port 13b, the advance chamber communicating port 13c, the retard chamber communicating port 13d, and the drain port 13e are holes formed on a lateral surface of the sleeve 13. The drain port 13e, the advance chamber communicating port 13c, the hydraulic pressure supply port 13b, the retard chamber communicating port 13d, and the drain port 13e are formed in this order in a direction from a left side (side opposed to the electromagnetic actuator 12) of FIG. 1 toward a right side (electromagnetic actuator 12 side) of FIG. 1.

The spool 14 has four large diameter portions (lands) 14a for blocking the ports. The large diameter portion 14a has an outer diameter, a size of which is approximately the same as a size of an inner diameter of the sleeve 13 (diameter of the insertion hole 13a).

An advance chamber drain small diameter portion 14b, a hydraulic pressure supply small diameter portion 14c, and a retard chamber drain small diameter portion 14d for changing communicating conditions of the input and output ports (13b to 13e) according to an axial position of the spool 14 are formed between each large diameter portion 14a.

The advance chamber drain small diameter portion 14b is for draining oil from the advance chamber 7a while oil is being supplied to the retard chamber 7b. The hydraulic pressure supply small diameter portion 14c is for supplying oil to one of the advance chamber 7a and the retard chamber 7b. The retard chamber drain small diameter portion 14d is for draining oil from the retard chamber 7b while oil is being supplied to the advance chamber 7a.

Figure 1:
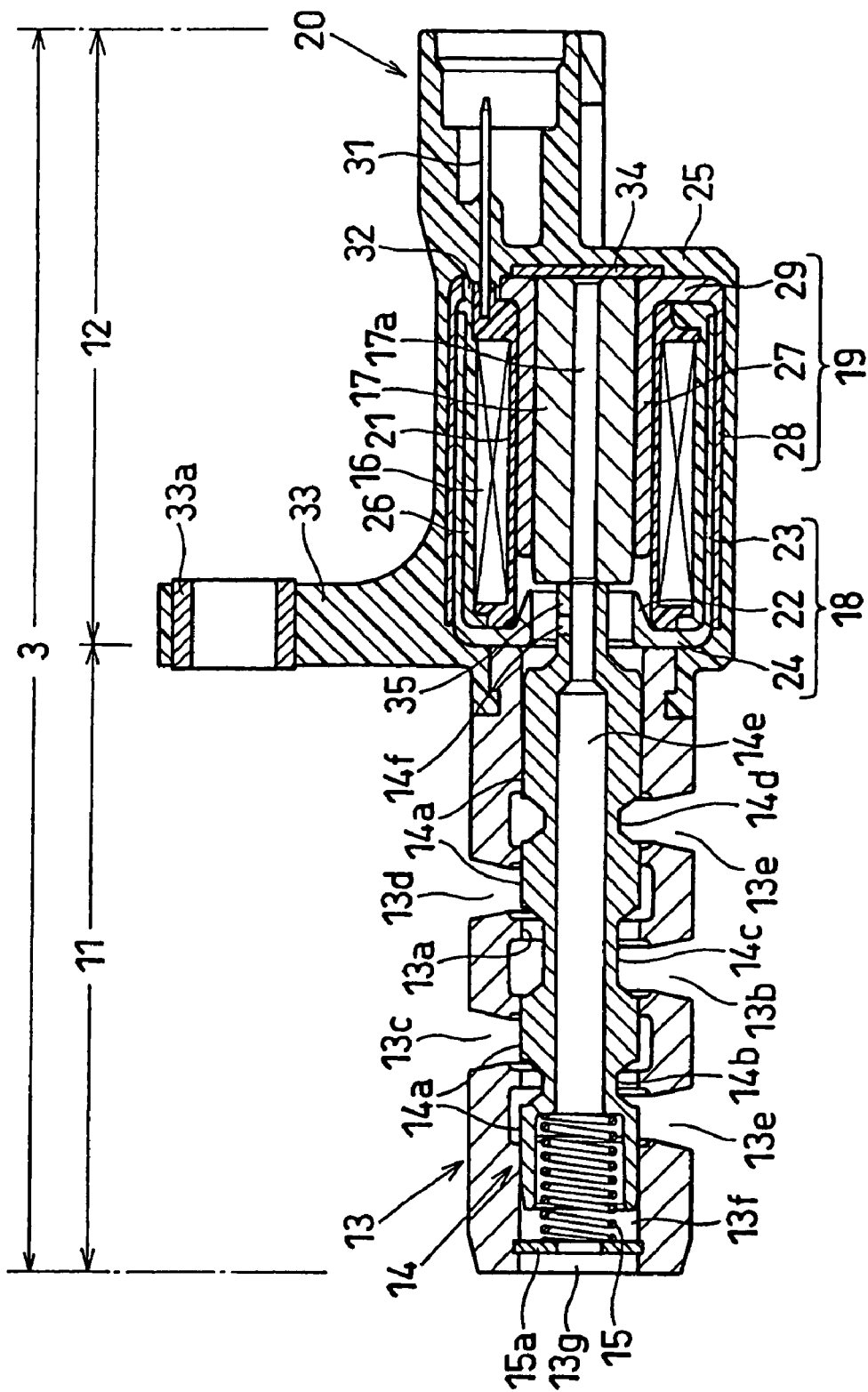
FIG. 1 is a sectional view of an OCV taken along an axial direction of the OCV according to an embodiment of the present invention.

The return spring 15 is a compression coil spring, which urges the spool 14 in a direction to the right side of FIG. 1. The return spring 15 is disposed in a spring chamber 13f of the sleeve 13 located on the left side of FIG. 1, being compressed in the axial direction between the spool 14 and a retaining ring 15a attached to an open end of the sleeve 13 at a left end of FIG. 1. The retaining ring 15a has a through hole, through which circulating oil is supplied or discharged.

(Electromagnetic Actuator 12)

The electromagnetic actuator 12 includes a coil 16, a plunger 17, a stator (a front stator 18 and a rear stator 19), and a connector 20.

The coil 16 generates magnetic force when energized, and is a magnetic force generating means for attracting the plunger 17 to a magnetic attraction portion 22 (to be described in greater detail hereinafter). The coil 16, which is made as a result of winding a dielectrically coated conductive wire (e.g., enamel wire) a number of times around a bobbin 21 having a generally cylindrical shape, has an annular shape, for example, a cylindrical shape.

The bobbin 21 is primary mold resin including a bobbin cylindrical portion and a bobbin flange. The coil 16 is wound around the bobbin cylindrical portion. At both end portions of the bobbin cylindrical portion, the bobbin flange holds end portions of the coil 16 in the axial direction (right and left ends of the coil 16 in FIG. 1). The bobbin 21 is formed by pouring molten fluid resin (e.g., PBT) into a forming mold of the bobbin 21.

The plunger 17 is a columnar body, which is formed from magnetic metal (e.g., iron: ferromagnetic material generating a magnetic circuit) attracted to the magnetic attraction portion 22 (to be described in greater detail hereinafter). The plunger 17 is in sliding contact directly with an inner circumferential surface of a radial direction magnetism delivery-receipt portion 27 (to be described in greater detail hereinafter), and is supported slidably by the radial direction magnetism delivery-receipt portion 27 in the axial direction.

Figure 2:
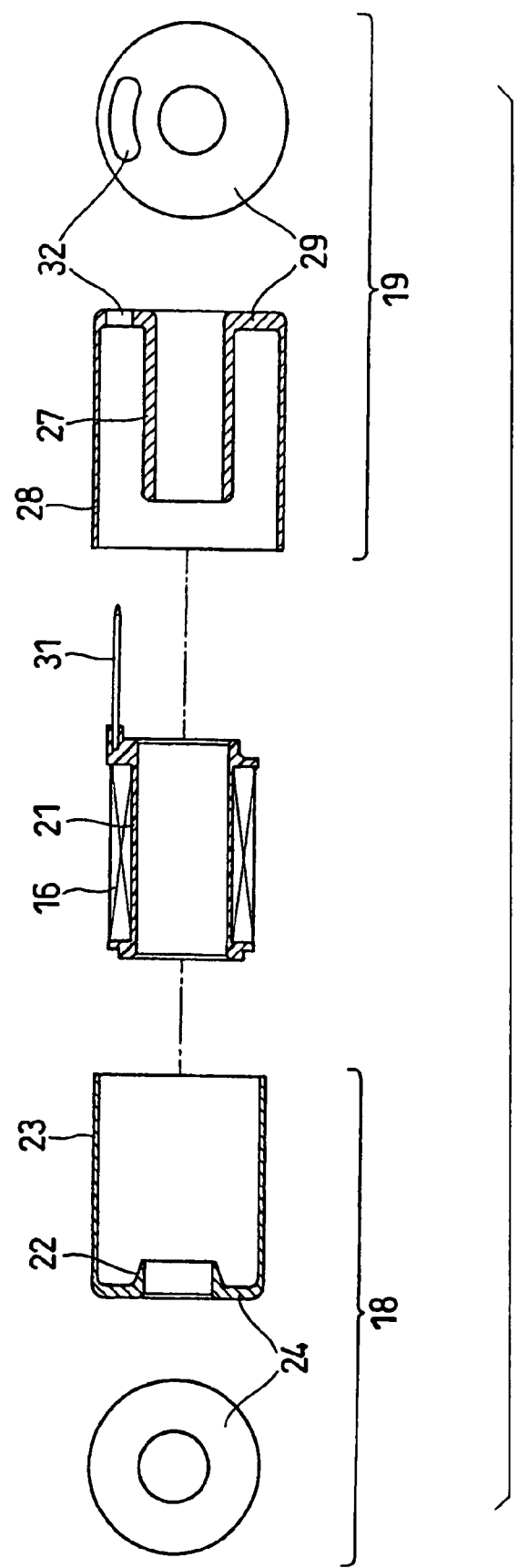
FIG. 2 is an exploded view illustrating a coil and a stator according to the embodiment.
Figure 3:
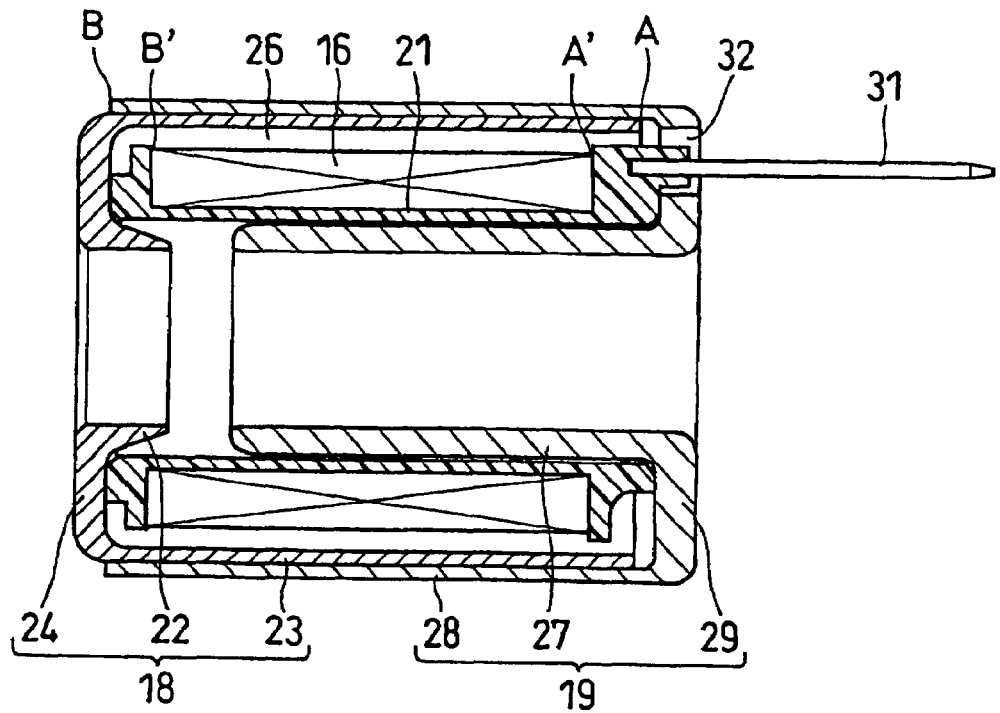
FIG. 3 is a sectional view of the stator, into which the coil is incorporated, taken along an axial direction of the stator before molding is performed using secondary mold resin, according to the embodiment.

The stator is described with reference to FIGS. 1 to 3 with a left side of each of FIGS. 1 to 3 referred to as "front", and a right side of each of FIGS. 1 to 3 as "rear".

The stator receives the coil 16, and form a closed magnetic circuit along inner and outer circumferences of the coil 16 through the plunger 17. The stator is formed by combining stators to dispose the coil 16 inside the stator. In the embodiment, the stator is formed by combining the front stator (corresponding to a first stator) 18 and the rear stator (corresponding to a second stator) 19.

The front stator 18 is formed from magnetic metal (e.g., iron: ferromagnetic material generating a magnetic circuit) by combining the magnetic attraction portion 22, a first yoke portion 23, and a front ring flange portion 24. The magnetic attraction portion 22 attracts the plunger 17 to the left side of FIG. 1 (in the axial direction). The first yoke portion 23 covers the outer circumference of the coil 16. The magnetic attraction portion 22 and the first yoke portion 23 are joined with the front ring flange portion 24.

The magnetic attraction portion 22 guides magnetic flux to a surrounding area of a left side of the plunger 17 in FIG. 1. The magnetic attraction portion 22 has a generally cylindrical shape so that a part of the plunger 17 crosses the magnetic attraction portion 22 in the axial direction without contacting the magnetic attraction portion 22. A tapered surface is formed on an outer circumferential portion of the magnetic attraction portion 22 such that magnetic attraction does not vary according to a stroke of the plunger 17.

In the embodiment, contact between the plunger 17 and the magnetic attraction portion 22 is avoided by forming a tapered surface on an outer circumference of an end portion of the plunger 17 (a portion of the plunger 17 that crosses the magnetic attraction portion 22 in the axial direction). However, the contact between the plunger 17 and the magnetic attraction portion 22 may be avoided by forming an inner circumferential surface of the magnetic attraction portion 22 in a tapered shape.

The first yoke portion 23 has a cylindrical shape. An inner diameter of the first yoke portion 23 is larger than an outer diameter of the coil 16 (including the bobbin 21), and a gap between the first yoke portion 23 and the coil 16 (including the bobbin 21) is filled with a secondary mold resin 25. A filling chamber 26, into which the secondary mold resin 25 is poured in a manufacturing process, is formed between the first yoke portion 23 and the coil 16 (including the bobbin 21).

The first yoke portion 23 is disposed to completely overlap with the coil 16 in the axial direction. That is, a rear end A of the first yoke portion 23 in the axial direction (open end of the first yoke portion 23: a right end of the first yoke portion 23 in FIG. 3) extends further in a direction toward a rear side than a rear end A' of the coil 16 in the axial direction.

The front ring flange portion 24 is a disk-shaped ring portion, with which the magnetic attraction portion 22 and the first yoke portion 23 are joined. Resin passages (a through hole: not shown), through which the secondary mold resin 25 poured in a manufacturing process passes, are formed annularly (e.g., at regular intervals) on a portion of the front ring flange portion 24 facing the filling chamber 26.

The rear stator 19 is formed from magnetic metal (e.g., iron: ferromagnetic material generating a magnetic circuit) by combining the radial direction magnetism delivery-receipt portion 27, a second yoke portion 28, and a rear ring flange portion 29. The radial direction magnetism delivery-receipt portion 27 covers an outer circumference of the plunger 17, and magnetism in a radial direction is delivered and received between the radial direction magnetism delivery-receipt portion 27 and the plunger 17. The second yoke portion 28 covers the outer circumference of the coil 16. The radial direction magnetism delivery-receipt portion 27 and the second yoke portion 28 are joined with the rear ring flange portion 29.

The radial direction magnetism delivery-receipt portion 27 has a cylindrical shape, which covers the outer circumference of the plunger 17. The radial direction magnetism delivery-receipt portion 27 supports the plunger 17 slidably in the axial direction, and magnetic flux in the radial direction is delivered and received between the plunger 17 and the radial direction magnetism delivery-receipt portion 27.

The second yoke portion 28 has a cylindrical shape similar to the first yoke portion 23. The second yoke portion 28 covers an outer circumference of the first yoke portion 23, and overlaps with the first yoke portion 23 in the axial direction, so that the second yoke portion 28 is magnetically joined to the first yoke portion 23. By covering the outer circumference of the first yoke portion 23 with the second yoke portion 28, the first yoke portion 23 overlaps with the second yoke portion 28, and is joined to the second yoke portion 28 with their overlap extending in the axial direction.

The second yoke portion 28 has an inner diameter, a size of which is approximately the same as a size of an outer diameter of the first yoke portion 23. The second yoke portion 28 is slightly pressed in on an outer circumferential surface of the first yoke portion 23, or joined to the first yoke portion 23 with a clearance for assembly therebetween.

The second yoke portion 28 is disposed to completely overlap with the coil 16 in the axial direction. That is, a front end B of the second yoke portion 28 in the axial direction (open end of the second yoke portion 28: a left end of the second yoke portion 28 in FIG. 3) extends further in a direction toward a front side than a front end B' of the coil 16 in the axial direction.

The rear ring flange portion 29 is a disk-shaped ring portion, with which the radial direction magnetism delivery-receipt portion 27 and the second yoke portion 28 are joined. The rear ring flange portion 29 has an extracting hole 32, through which two terminals 31 pass. The coil 16 is energized via the terminals 31. The extracting hole 32 also serves as an inlet, through which the molten secondary mold resin 25 is poured into the filling chamber 26 in a manufacturing process.

The connector 20 is a connecting means for connecting with an external connector, and the connecting means is formed from a part of the secondary mold resin 25, with which resin molding is performed on the coil 16 and the like. The terminals 31 respectively connected to both end portions of the conductive wire of the coil 16 are disposed inside the connector 20. Resin molding is performed on the terminal 31 using the secondary mold resin 25, with its one end portion exposed inside the connector 20 and its other end portion inserted in and held by the bobbin 21.

The secondary mold resin 25 has a function of being formed into a housing of the electromagnetic actuator 12, a function of joining the spool valve 11 to the electromagnetic actuator 12, and a function of being formed into a bracket 33, which is used for fixing the OCV 3 to an object such as an engine head, as well as a function of mold-fixing the coil 16 in the stator after the filling chamber 26 is filled with the secondary mold resin 25, a function of being formed into the connector 20, as described above. The secondary mold resin 25 is formed by pouring molten fluid resin (e.g., PBT) into the forming mold, in which functional components of the electromagnetic actuator 12 are arranged.

In addition, fastening force of a fastening bolt is applied to a metal sleeve 33a held by the bracket 33 by molding.

When the molten secondary mold resin 25 is poured into the forming mold, both end portions of the bobbin 21 in the axial direction are placed between and held by the front stator 18 and the rear stator 19. Accordingly, the secondary mold resin 25 poured into the filling chamber 26 does not flow into an inner circumferential side of the bobbin 21. A circular plate 34, which is made of nonmagnetic material and blocks an inner circumferential side of the radial direction magnetism delivery-receipt portion 27 (a sliding portion of the plunger 17), is attached on a rear end of the rear stator 19. Accordingly, the molten secondary mold resin 25 does not flow into the inner circumferential side of the radial direction magnetism delivery-receipt portion 27.

The OCV 3 transmits driving force of the plunger 17, which is applied in a direction toward the left side of FIG. 1, to the spool 14. The OCV 3 has a shaft 35 that transmits urging force of the return spring 15, which is applied to the spool 14, to the plunger 17.

The shaft 35 in the embodiment is provided on a right side portion of the spool 14 in FIG. 1 integrally with the spool 14. However, the shaft 35 may be provided independently of the spool 14.

A spool circulation passage 14e formed in a shaft center of the spool 14 including the shaft 35 communicates with a plunger circulation passage 17a formed in a shaft center of the plunger 17, so that a volume changing portion in the plunger 17 on the right side in FIG. 1 and a drain port 13g formed at an end portion of the sleeve 13 communicate through them.

A circulation hole 14f, through which a volume changing chamber around the shaft 35 and the spool circulation passage 14e communicate, is formed on the shaft 35.

(ECU 4)

The ECU 4 is a widely known computer, and has a VVT control function of controlling the VVT. The VVT control function duty ratio-controls an amount of an electric current (supply current amount) passing through the coil 16 based on an engine operating condition (including an operating condition by an occupant) loaded by various sensors and on a VVT control program stored in a memory of the ECU 4. The VVT control function controls an advance phase of the camshaft to be such an advance phase that accords with the engine operating condition by controlling the amount of the electric current passing through the coil 16 to control an axial position of the spool 14, thereby controlling hydraulic pressure in the advance chamber 7a and the retard chamber 7b.

(Workings of VVT)

When the ECU 4 advances the camshaft according to a vehicle operating condition, the ECU 4 increases the supply current amount for the coil 16. Accordingly, magnetic force generated by the coil 16 increases, so that the plunger 17, the shaft 35, and the spool 14 are displaced to the left side (advance side) in FIG. 1. As a result, a degree of communication between the hydraulic pressure supply port 13b and the advance chamber communicating port 13c increases, and a degree of communication between the retard chamber communicating port 13d and the drain port 13e increases. Consequently, hydraulic pressure in the advance chamber 7a increases, and hydraulic pressure in the retard chamber 7b decreases, so that the vane rotor 6 is relatively displaced in the advance direction in reference to the shoe housing 5 and the camshaft is advanced.

Conversely, when the ECU 4 retards the camshaft according to the vehicle operating condition, the ECU 4 decreases the supply current amount for the coil 16. Accordingly, magnetic force generated by the coil 16 decreases, so that the plunger 17, the shaft 35, and the spool 14 are displaced to the right side (retard side) in FIG. 1. As a result, a degree of communication between the hydraulic pressure supply port 13b and the retard chamber communicating port 13d increases, and a degree of communication between the advance chamber communicating port 13c and the drain port 13e increases. Consequently, hydraulic pressure in the retard chamber 7b increases, and hydraulic pressure in the advance chamber 7a decreases, so that the vane rotor 6 is relatively displaced in the retard direction in reference to the shoe housing 5 and the camshaft is retarded.

In the OCV 3 of the embodiment, the front stator 18 formed by combining the magnetic attraction portion 22 and the first yoke portion 23, and the rear stator 19 formed by combining the radial direction magnetism delivery-receipt portion 27 and the second yoke portion 28 are used as the stator of the electromagnetic actuator 12. The first yoke portion 23 and the second yoke portion 28 are magnetically joined by overlapping them in the axial direction.

Accordingly, there is one joining portion of the front stator 18 and the rear stator 19, which are provided separately to receive the coil 16. Since the number of joining portions of the stators is reduced to one, magnetic loss caused at joining portions is restricted to the minimum and decrease in magnetic flux of the stators is restricted.

By restricting the decrease in magnetic flux of the stators, magnetic attraction of the plunger 17 is increased, so that responsivity of the OCV 3 is improved.

Because the first yoke portion 23 and the second yoke portion 28 are magnetically joined by overlapping them in the axial direction, a joining area of the joining portion is made large. Thus, magnetic saturation at the joining portion is difficult to reach. Accordingly, magnetic loss caused at joining portions is restricted to the minimum and decrease in magnetic flux of the stators is restricted.

The joining area of the stators is made large. Consequently, when magnetic force of the coil 16 is increased, a problem that the joining portion becomes a bottleneck in increase in magnetic flux is avoided. Thus, by increasing magnetic force of the coil 16, the magnetic flux of the stators is increased, so that the responsivity of the OCV 3 is improved.

The rear end A of the first yoke portion 23 in the axial direction extends further in the direction toward the rear side than the rear end A' of the coil 16 in the axial direction. Accordingly, the overlap between the first yoke portion 23 and the second yoke portion 28 in the axial direction is made large, so that the joining area of the first yoke portion 23 and the second yoke portion 28 is made large. As a result, the magnetic loss at joining portions is restricted to a small amount, and decrease in magnetic flux of the stators is restricted.

As well, the front end B of the second yoke portion 28 in the axial direction extends further in the direction toward the front side than the front end B' of the coil 16 in the axial direction. Accordingly, the overlap between the first yoke portion 23 and the second yoke portion 28 in the axial direction is made large, so that the joining area of the first yoke portion 23 and the second yoke portion 28 is made large. As a result, the magnetic loss at joining portions is restricted to a small amount, and decrease in magnetic flux of the stators is restricted.

Both the first yoke portion 23 and the second yoke portion 28 have cylindrical shapes. Accordingly, the joining area of the first yoke portion 23 and the second yoke portion 28 is made very large, so that the magnetic loss at joining portions is restricted to a small amount.

Since the second yoke portion 28 is stacked on the outer circumference of the first yoke portion 23, the diameter of the second yoke portion 28 is made large. Accordingly, a width of the rear ring flange portion 29 in the radial direction is made large, so that the extracting hole 32 for the terminal 31 is made large in the radial direction, thereby making large an insulation distance between the terminal 31 and the second yoke portion 28. Because the extracting hole 32 is made large in the radial direction, the molten secondary mold resin 25 is easily poured into the filling chamber 26 in a manufacturing process, so that labor effectiveness is improved.

(Modifications)

In the above embodiment, the present invention is applied to the OCV 3, which is used for the VVT. However, the present invention may be applied to an OCV (e.g., OCV for hydraulic control in an automatic transmission) used in an apparatus other than the VVT.

In the above embodiment, the present invention is applied to the electromagnetic spool valve used as the OCV 3. However, the present invention may be applied to an electromagnetic spool valve, which is used for the switching, pressure-regulation, and flow control of fluid other than oil.

In the above embodiment, the spool valve 11 is driven by the electromagnetic actuator 12, to which the present invention is applied. However, the present invention may be applied to an electromagnetic actuator, which drives a valve mechanism different from the spool valve 11. In other words, the present invention may be applied to an electromagnetic actuator in any electromagnetic valve.

Furthermore, the present invention may be applied to an electromagnetic actuator, which is used in an apparatus other than an electromagnetic valve.

Additional advantages and modifications will readily occur to those skilled in the art. The invention in its broader terms is therefore not limited to the specific details, representative apparatus, and illustrative examples shown and described.

What is claimed is:

1. An electromagnetic actuator comprising:
   a coil that is formed in an annular shape, wherein the coil generates magnetic force when energized;
   a plunger; and
   a stator that receives the coil inside the stator, wherein:
   the stator forms a magnetic circuit along inner and outer circumferences of the coil through the plunger;
   the stator includes a first stator and a second stator;
   the first stator includes a magnetic attraction portion that attracts the plunger in an axial direction of the plunger by the magnetic force generated by the coil, and a first yoke portion that covers the outer circumference of the coil;
   the second stator includes a radial direction magnetism delivery-receipt portion that delivers magnetism in a radial direction of the plunger to and receives magnetism in the radial direction from the plunger, and a second yoke portion that covers the outer circumference of the coil; and
   the first yoke portion and the second yoke portion overlap in the axial direction and are magnetically joined.

2. The electromagnetic actuator according to claim 1, wherein the first yoke portion is disposed to completely overlap with the coil in the axial direction.

3. The electromagnetic actuator according to claim 1, wherein the second yoke portion is disposed to completely overlap with the coil in the axial direction.

4. The electromagnetic actuator according to claim 1, wherein:
   at least one of the first yoke portion and the second yoke portion has a cylindrical shape; and
   the one of the first yoke portion and the second yoke portion covers the other one of the first yoke portion and the second yoke portion, so that the first yoke portion and the second yoke portion are magnetically joined.

5. The electromagnetic actuator according to claim 4, wherein:
   the second stator further includes a ring flange portion between the radial direction magnetism delivery-receipt portion and the second yoke portion;
   the ring flange portion has an extracting hole, through which a terminal is extracted;
   the coil is energized through the terminal; and
   the second yoke portion covers an outer circumferential surface of the first yoke portion.

6. The electromagnetic actuator according to claim 1, wherein:
   the electromagnetic actuator and a spool valve constitute an electromagnetic spool valve;
   the spool valve includes a sleeve that has a generally cylindrical shape, and a spool that is displaced in the sleeve in the axial direction; and
   the spool valve switches flow passages and regulates pressure and flow volume.

* * * * *